United States Patent [19]
Kadis

[11] Patent Number: 5,578,772
[45] Date of Patent: Nov. 26, 1996

[54] METHOD AND FIXTURE FOR HOLDING THREADED VALVE ASSEMBLIES FOR TESTING

[76] Inventor: Paul M. Kadis, 9685 Fox Meadow, Chardon, Ohio 44024

[21] Appl. No.: 161,055

[22] Filed: Dec. 1, 1993

[51] Int. Cl.⁶ .................................................. G01D 21/00
[52] U.S. Cl. ........................................ 73/866.5; 73/865.9
[58] Field of Search .................................. 73/37, 40, 46, 73/40.7, 168, 865.9; 248/542, 637, 127; 137/551

[56] References Cited

U.S. PATENT DOCUMENTS

| | | | |
|---|---|---|---|
| 4,570,903 | 2/1986 | Crass | 73/168 |
| 4,633,713 | 1/1987 | Mesnard et al. | 73/866.5 |
| 4,660,416 | 4/1987 | Charbonneau et al. | 73/168 |
| 4,690,003 | 9/1987 | McNennamy et al. | 73/168 |
| 4,876,905 | 10/1989 | Callsen et al. | 73/866.5 |

*Primary Examiner*—Richard Chilcot
*Assistant Examiner*—Max H. Noori
*Attorney, Agent, or Firm*—John R. Benefiel

[57] ABSTRACT

A test fixture and method involves the use of a rotary element mounted within a fixture, the element having an internally threaded bore engaging a threaded body portion of the valve assembly and adapted to be selectively rotated by a drive motor to be drawn into a bore in the fixture accepting a stem portion of the valve assembly. A wrenching hexagonal contour on the housing receives a hex contour on a body portion of the valve assembly to hold the valve assembly against rotation upon insertion into the fixture bore. A sealing ring is compressed as the valve stem is fully drawn into the fixture bore, damage to the seal being avoided by not rotating the valve assembly during installation or removal.

5 Claims, 2 Drawing Sheets

METHOD AND FIXTURE FOR HOLDING THREADED VALVE ASSEMBLIES FOR TESTING

BACKGROUND OF THE INVENTION

This invention concerns holding fixtures and methods for testing valve assemblies which requires the valve assemblies to be threaded into a fixture housing block, as is often done with so-called hydraulic and air "cartridge" valves. Such cartridge valves have a threaded stem, which typically project from a housing enclosing an electrical coil operator. Other types of cartridge valve operators are also used. A wrenching contour is formed on the valve stem which is engaged with a wrench and rotated manually to advance the threaded section of the valve stem into a threaded bore in the fixture housing block.

An O-ring seal is located against a shoulder located beneath the wrenching contour and when compressed against a surrounding surface seals the valve assembly in the fixture as the valve assembly is seated in the threaded bore.

When conducting a test, the operator housing is typically removed and the valve threaded into the threaded bore in the test block and tightened using a wrench. The operator housing then must be reinstalled in order to test the valve function.

This procedure has the disadvantage that when the valve is removed from the test block, the O-ring seal is often damaged as the threads of the valve stem are rotated within the O-ring.

Furthermore, the test procedure itself is relatively slow due to the need for manual assembly and disassembly of the operator housing and threading of the valve assembly into and out of the housing block.

Accordingly, it is an object of the present invention to provide a method and fixture which simplifies the testing of valve assemblies which are required to be threaded into a housing block.

SUMMARY OF THE INVENTION

According to the present invention, a fixture housing block is provided with a bore receiving the valve stem of the valve assembly to be tested, and a holding plate is mounted over the bore, the holding plate having an opening shaped to receive the wrenching contour on the valve assembly to prevent rotation of a valve assembly having its stem inserted in the housing block bore.

The fixture housing block has a ring element rotatably mounted therein, the ring element formed with an internal bore having a thread mating with the thread on the valve stem. A selectively activatable drive motor acting through gearing causes the ring element to be rotated after the valve assembly is inserted into the test block. The threaded engagement causes the valve assembly to be drawn down to seat the O-ring seal against a sealing surface without any rotation of the valve assembly. After testing, the threaded ring element is driven in a reverse direction to release the valve assembly from the housing block.

Accordingly, the O-ring seal is never brought into contact with rotating threads and no manual wrenching of the valve assembly or disassembly of the valve assembly is required.

DETAILED DESCRIPTION

In the following detailed description certain specific terminology will be employed for sake of clarity and a particular embodiment described in accordance with the requirements of 35 USC 112, but it is to be understood that the same is not intended to be limiting and should no be so construed inasmuch as the invention is capable of taking many forms and variations within the scope of the appended of the appended claims.

Figure 1:
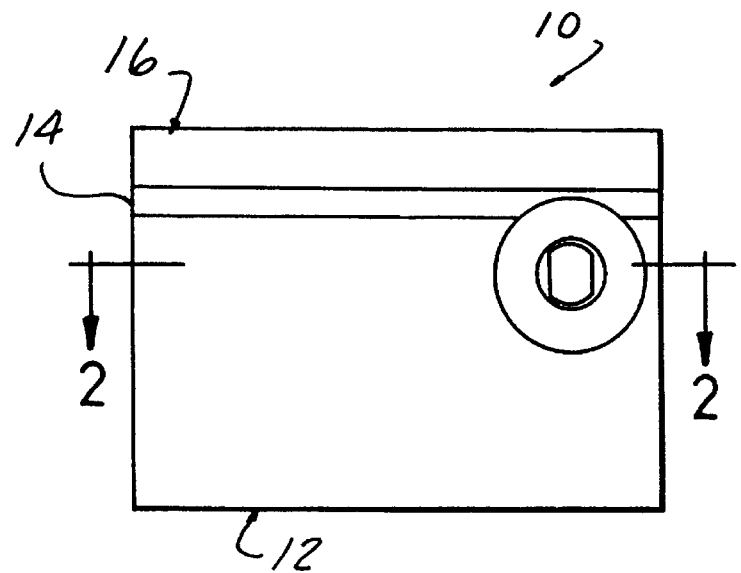
FIG. 1 is a side elevational view of the test fixture according to the present invention.
Figure 2:
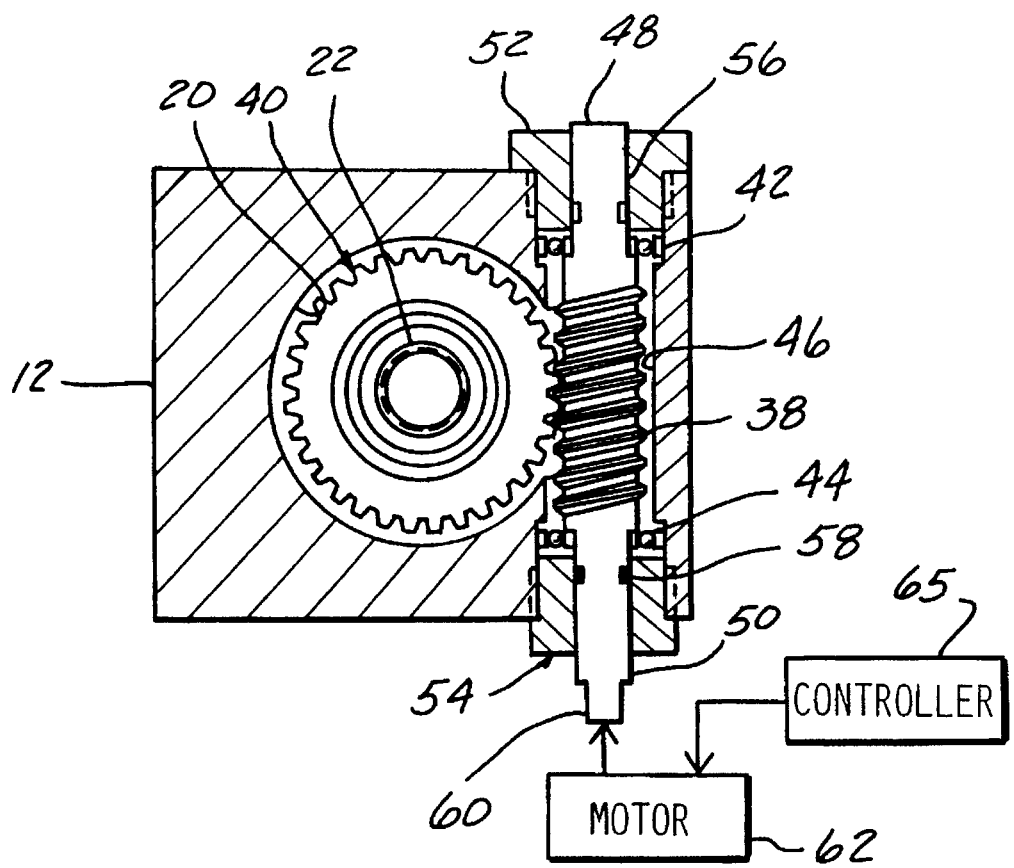
FIG. 2 is a view of the section 2—2 taken in FIG. 1.
Figure 3:
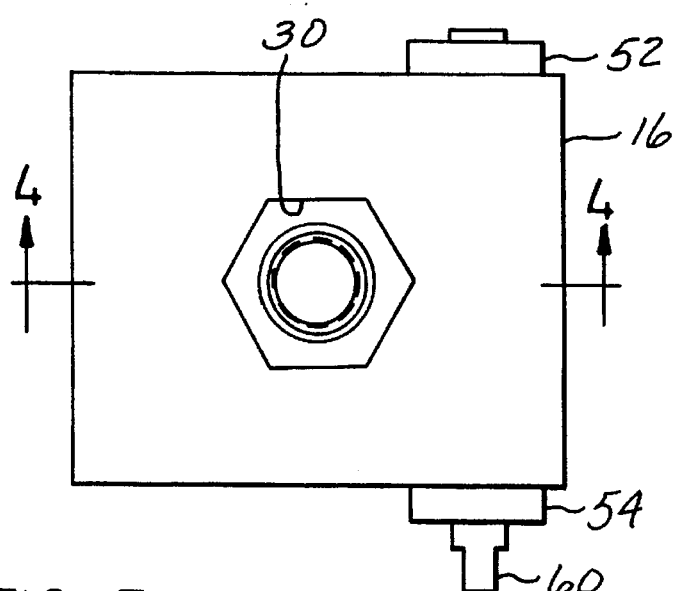
FIG. 3 is a top view of these test fixtures according to present invention.
Figure 4:
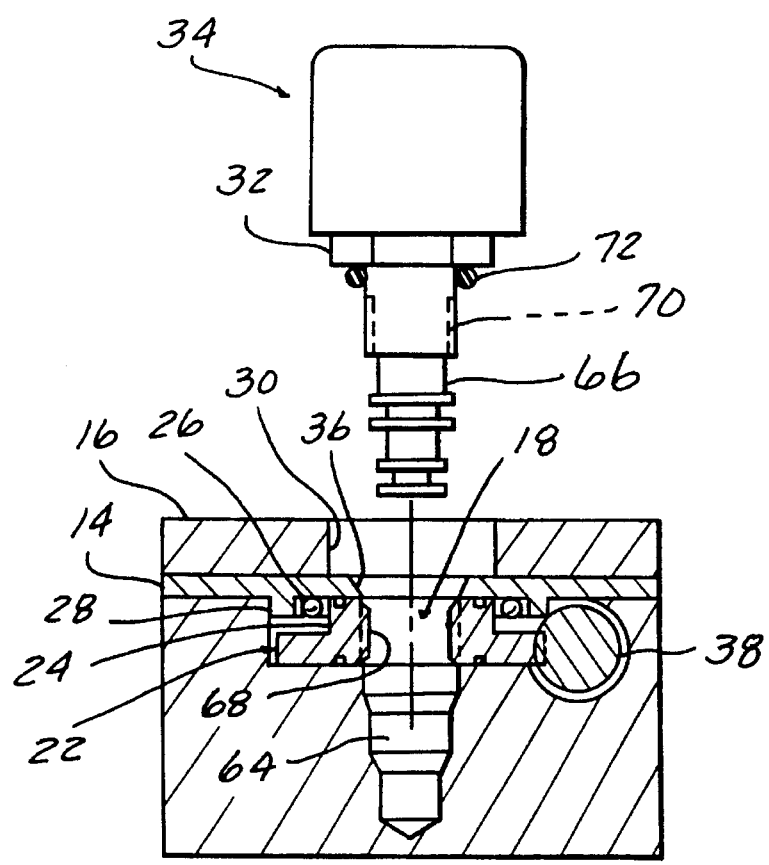
FIG. 4 is a sectional view of the test fixture shown in FIGS. 1–3 together with a view of a valve assembly to be tested shown in position over the test fixture and ready to be inserted into a bore of the test fixture according to the invention.

Referring to FIGS. 1–4, the test fixture 10 according to the present invention includes housing means comprised of a generally rectangular housing block 12 provided with a cover plate 14 overlying the upper surface of the housing block 12, which cover plate 14 is in turn overlain by a holding plate 16 which is fixed by means of screws (not shown). The housing block 12 is formed with a vertically extending stepped bore 18. The upper region of the stepped bore 18 is formed by a relatively large diameter section 20 sized to accommodate a rotary element comprised of a ring gear 22. The ring gear 22 is formed with a hub 24 rotatably guided by means of a bearing 26 mounted on the inside of a pilot boss 28 of the cover plate 14. The pilot boss 28 projects into the bore section 20, as shown in FIG. 4.

A hex opening 30 is formed in the holding plate 16 at a location above the bore 18. The hex opening 30 is shaped to mate with a wrenching hexagonal contour 32 formed on the valve assembly 34 at a location intermediate the length of the valve assembly 34 to be tested.

The cover plate 14 is provided with a tapering O-ring seating bore 36 aligned with the bore 18.

The ring gear 22 is adapted to be selectively rotated in either direction by means of gearing, here shown as a worm gear 38 meshing with the peripheral teeth 40 on the outside of the ring gear 22. The worm gear 38 is rotatably supported in the housing block 12 by means of a pair of anti-friction bearings 42 and 44 received in transverse bore 46 in the housing block 12.

A pair of extensions 48 and 50 integral with the worm gear 38 extend through threaded plugs 52 and 54 received in threaded counterbores in the block housing bore 46. Suitable seals 56, 58 seal the interior space within the valve block 12.

The worm gear extension 50 is formed with a drive surface 60 which is adapted to be selectively rotated in either direction by means of an electric, hydraulic, or air motor 62 controlled by means of a switch or valve motor controller 65.

The bore 18 is provided with a lower valve stem receiving section 64 which mates with a stem portion 66 of the valve assembly 34 upon insertion of the valve assembly 34 into the bore 18.

Various passages and fluid supply means (not shown) are provided for conventionally conducting the hydraulic or pneumatic testing required to evaluate the function of the valve assembly to be tested. These details are not here included inasmuch as they do not form a part of the present invention.

The ring gear 22 is also provided with an internally threaded bore 68, which is adapted to mate with a threaded body portion 70 of the valve assembly 34 adjacent the valve stem 66. An O-ring seal 72 is disposed on a shoulder formed beneath the wrenching contour 32 and the threaded section 70. The seal 72 is compressed against the surface of the bore 36 upon insertion of a valve assembly into the bore 18.

In use, the valve assembly 34 to be tested is inserted into the bore 18, the hex wrenching surface 32 fit into the opening 30 of the holding plate 16. The stem portion 66 is received in the bore section 64 and the leading edge of the threaded section 70 brought into contact with the internal threaded bore 68. The controller 65 is activated causing the motor 62 to rotate the worm gear 38, in turn rotating the ring gear 22 in a direction such as to advance the threaded section 70 in a direction drawing the valve assembly 34 and the valve stem 66 into a seated condition within the bore section 64 and compressing the O-ring seal 72 against the tapered bore 36.

Upon completion of the testing procedure, the motor controller 65 is again activated to cause motor 62 to be rotated in a reverse direction causing the threaded section 70 to be advanced upwardly and releasing the valve assembly 34.

Engagement of the wrenching contour with the opening 30 prevents any rotation of the valve assembly 34 and thus the O-ring 72 is not subjected to rotational contact with the threads 70 during installation or removal of the valve assembly 34 to be tested. At the same time, the installation and release procedure is much quicker since neither manual wrenching of the valve assembly nor removal of the coil when installing the same in the test fixture is required.

Accordingly, the described fixture accomplishes the above recited object of the present invention.

I claim:

1. A test fixture for testing a valve assembly having a stem section including threaded body portion and sealing ring encircling said threaded body portion, said test fixture comprising:

housing means having an open bore configured to receive said valve stem section readily insertable into said bore, said valve assembly being held against rotation when said valve stem is inserted in said bore;

a rotary element rotatably mounted within said housing means having an internally threaded bore aligned with said valve housing bore, the thread of said internally threaded bore adapted to threadedly mate with said threaded body portion of said valve assembly to be tested;

selectively actuatable drive means for causing said rotary element to be rotated in either rotative direction, said valve assembly moved axially in said bore by rotation of said rotary element;

a seal engaging surface concentric to said housing bore and located to be engaged with said sealing ring as said valve assembly is drawn into said housing bore by rotation of said rotary element by said drive means in a direction causing advance of said threaded body portion into said threaded internal bore, whereby said valve assembly can be drawn axially into said test fixture and said sealing ring sealed against said seal engaging surface without being rotated.

2. The test fixture according to claim 1 wherein said valve assembly to be tested is formed with a wrenching contour, and wherein said housing means includes an opening adapted to receive said wrenching contour upon insertion of said valve stem section into said housing bore to prevent rotation of said valve assembly to be tested when inserted into said fixture.

3. The test fixture according to claim 2 wherein said rotary element comprises a ring gear having peripheral teeth, said drive means includes gearing engaging said ring gear peripheral teeth, and a drive motor rotating said gearing.

4. A method of installing a valve assembly into a test fixture, said valve assembly of a type having a threaded body portion, and an aligned valve stem adapted to be inserted into an open bore in said fixture for testing, the method comprising the steps of:

positioning a rotary element within said fixture;

forming said rotary element formed with an internal thread configured to threadably mate with said threaded body portion;

aligning said threaded internal bore with said fixture bore;

inserting said valve assembly partially into said fixture bore so as to bring said threaded body portion within said threaded internal bore of said rotary element;

rotating said rotary element and at the same time holding said valve assembly against rotation, to cause said rotary element to draw said valve stem fully into said bore;

mounting a sealing ring around said body portion and locating a sealing surface so as to engage said sealing ring as said valve assembly is fully drawn into said fixture bore.

5. The method according to claim 4 wherein said valve assembly is held by positioning a wrenching contour formed on said valve assembly within a wrenching opening formed in a fixed structure as said valve assembly is partially inserted into said fixture bore.

* * * * *